United States Patent [19]

Esgro et al.

[11] Patent Number: 4,697,381

[45] Date of Patent: Oct. 6, 1987

[54] LINEAR CRAB TRAPPING DEVICE

[76] Inventors: Michael Esgro, 7 Lawrencia Dr.; Myron Jurczynski, 175 Federal City Rd., both of Lawrenceville, N.J. 08648

[21] Appl. No.: 5,547

[22] Filed: Jan. 21, 1987

[51] Int. Cl.[4] ............................................. A01K 69/00
[52] U.S. Cl. ..................................................... 43/100
[58] Field of Search ............................ 43/100, 87, 4.5

[56] References Cited

U.S. PATENT DOCUMENTS

| | | | |
|---|---|---|---|
| 2,071,453 | 2/1937 | Burns | 43/87 |
| 2,656,642 | 10/1953 | Richa | 43/100 |
| 2,793,466 | 5/1957 | Esposito | 43/87 |
| 3,815,276 | 6/1974 | Harrison | 43/43.1 |
| 4,083,142 | 4/1978 | Gregerson | 43/87 |
| 4,216,607 | 8/1980 | Lyster | 43/87 |
| 4,271,625 | 6/1981 | Archer | 43/100 |

*Primary Examiner*—Gene P. Crosby

*Attorney, Agent, or Firm*—Sperry, Zoda & Kane

[57] ABSTRACT

A linear crab trapping device including a main line with a plurality of individual loops secured thereto in spaced relation with respect to one another and further including a lower end adapted to be in abutment with any particular configuration of bait such that the lower portion of the main line can then be wrapped about the bait to provide the plurality of loops in surrounding engagement with the bait. The upper end of the main line is adapted to be secured to a user or fisherman in such a manner as to facilitate removal of the linear crab trapping device upon entanglement with a crab. A crab upon locating the bait will during feeding thereon become entangled in the plurality of loops surrounding the bait in such a manner as to temporarily be secured with respect to the main line such that removal by the user upon pulling upwardly on the upper end thereof will remove the linear crab trapping device and the entangled crab simultaneously.

18 Claims, 2 Drawing Figures

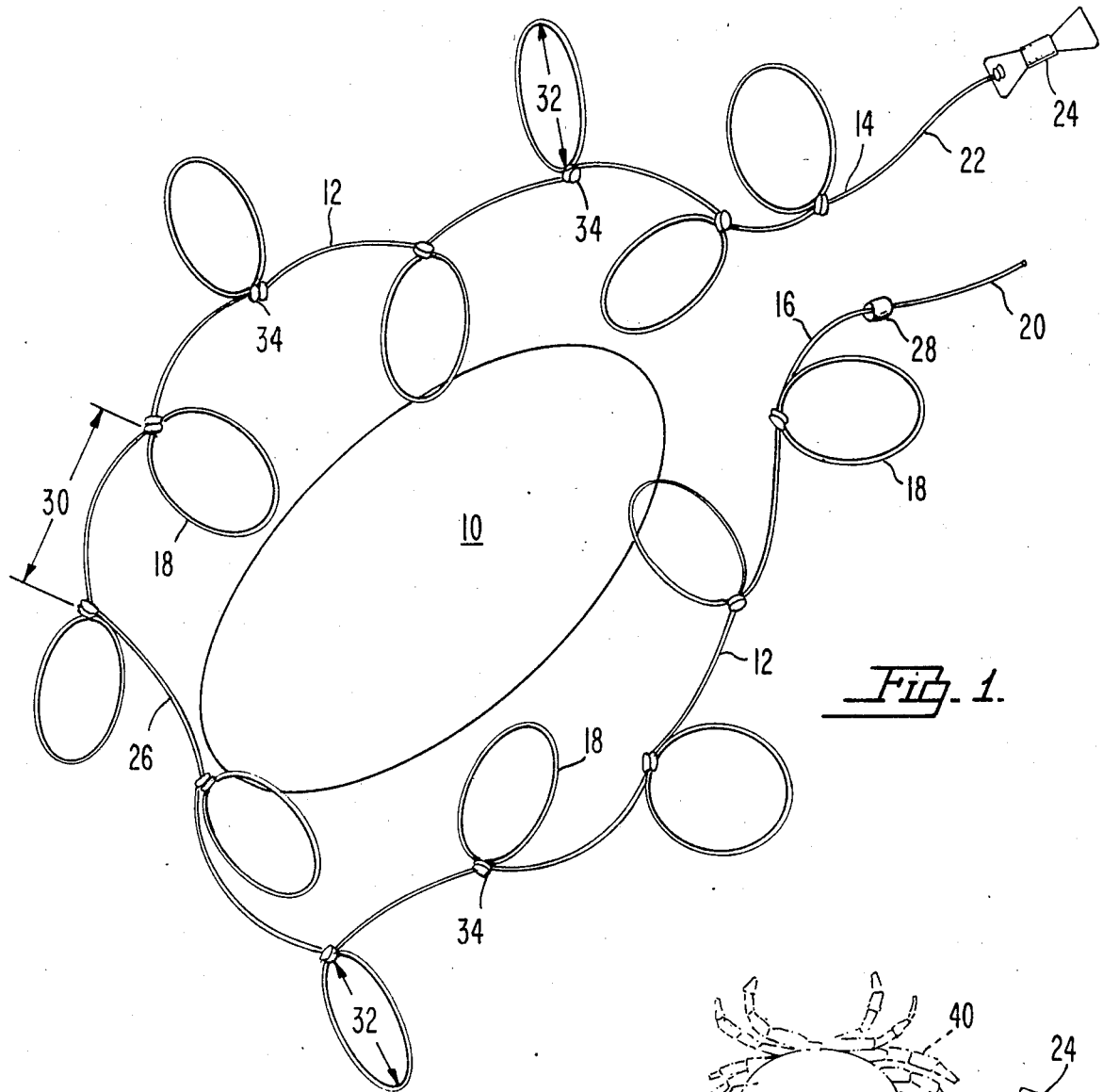
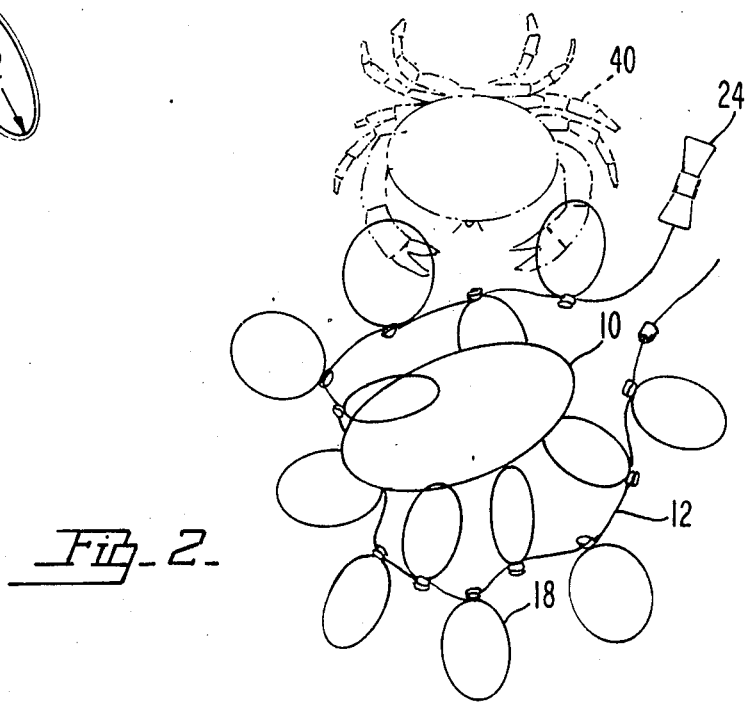

LINEAR CRAB TRAPPING DEVICE

BACKGROUND OF THE INVENTION

1. Field of the Invention

The present invention deals with devices for "crabbing". Crabbing devices can take a number of different forms from very complicated structures to very simplistic structures. Latest configurations are rather complicated with many moving parts and require normally some type of a sliding engagement in order to loop around an extremity of the crab and to be tightened therearound responsive to pulling away by the crab. The present invention provides a means for crabbing without any moving parts whatsoever.

2. Description of the Prior Art

Examples or prior art devices for use in trapping crabs are such as shown in U.S. Pat. No. 2,656,642 patented Oct. 27, 1953 to J. H. Richa on a Lobster and Crab Catcher; U.S. Pat. No. 2,793,466 patented May 28, 1957 to R. J. Esposito on a Garfish Trapping Snare; U.S. Pat. No. 3,815,276 patented June 11, 1974 to Daniel A. Harrison on a Crab Lure and Trap; U.S. Pat. No. 4,083,142 patented Apr. 11, 1978 to K. J. Gregerson on an Animal Snare; U.S. Pat. No. 4,216,607 patented Aug. 12, 1980 to E. F. Lyster on a Crab-Snaring Device; and U.S. Pat. No. 4,271,625 patented June 9, 1981 to F. J. Archer on an Ocean Crab Trap.

The present invention is distinguishable over all of these crab traps shown in these above patents in view of the absence of any moving parts whatsoever and the simplicity of design.

SUMMARY OF THE INVENTION

The linear crab trapping device of the present invention is adapted to be wrapped around a piece of bait and for that purpose includes a main line extending longitudinally and including an upper end means adapted to be retained by the user and a lower end means adapted to be positioned adjacent to the bait.

A plurality of loops are secured with respect to the main line in spaced relation with respect to one another therealong. Each of these loops extends laterally outwardly with respect to the main line in such a manner as to surround a piece of bait when the main line is wrapped around this bait. In this manner a crab will become temporarily engaged or entangled while feeding on the bait to facilitate removal from the water. In one preferred embodiment the loops are integral with respect to the main line in such a manner that they comprise sections of the same material of which the main line is made which are tied by knots to maintain the loop therein. Preferably the main line is approximately five feet long and includes an extra line means at the lower end to facilitate attachment to a piece of bait. Furthermore, the main line can include a second extra line at the upper end of the main line to facilitate holding thereof by the user.

To further facilitate usage of the linear crab trap of the present invention, a leader means may be secured to the upper end of the main line to facilitate holding by the user. Preferably each of the loops are approximately one to two inches in diameter. These loops should be held in fixed positions with respect to one another such that they are spaced apart by approximately two inches along the main line means. In certain configurations the loop means can be movably positioned along the main line such as with the integral structure merely by untying and retying of the individual loops. The line itself of which the loops and main line are made is preferably a nylon monofilament line.

To facilitate movement of the linear crab trapping device below the water surface, a weighting means may be selectively securable with respect to the main line or the lower end thereof. In the preferred configuration there are approximately 25 individual loops secured to the five foot section of the main line. This provides sufficient means of entanglement or engaging of a crab to be caught while facilitating easy disengagement once the crab has been removed from the water.

It is an object of the present invention to provide a linear crab trapping device which is easy to use.

It is an object of the present invention to provide a linear crab trapping device which is compact and light weight.

It is an object of the present invention to provide a linear crab trapping device which employs a simple basic design.

It is an object of the present invention to provide a linear crab trapping device which is disposable.

It is an object of the present invention to provide a linear crab trapping device which can be utilized with any type of bait.

It is an object of the present invention to provide a linear crab trapping device which can be used as a drop line.

It is an object of the present invention to provide a linear crab trapping device which can be used as a throw line.

It is an object of the present invention to provide a linear crab trapping device which can be used at the end of a fishing pole.

It is an object of the present invention to provide a linear crab trapping device which can be used in any chosen depth of water.

It is an object of the present invention to provide a linear crab trapping device which can be retrieved in a fast or slow manner while still maintaining the crab in engagement therewith which can be used in oceans or bays.

It is an object of the present invention to provide a linear crab trapping device which can be used with or without additional weighting configurations.

It is an object of the present invention to provide a linear crab trapping device which can be used off of land or boats.

It is an object of the present invention to provide a linear crab trapping device which facilitates the easy removal of crabs therefrom.

It is an object of the present invention to provide a linear crab trapping device which can be made from readily available thirty pound nylon filament fishing line.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of an embodiment of a linear crab trapping device of the present invention; and FIG. 2 is a perspective illustration of an embodiment of the linear crab trapping device of the present invention showing feeding thereon by a crab.

DETAILED DESCRIPTION OF THE PREFERRED EMBODIMENT

The present invention provides a linear crab trapping device adapted to be selectively secured about bait 10. This bait may be of any normally chosen type of bait which has some significant body to it such as to allow main line means 12 of the linear crab trapping device to be wrapped therearound.

Main line means 12 preferably includes an upper end means 14 which is adapted to be retained by the user. A lower end means 16 at the bottom portion of main line 12 is adapted to be placed in abutment with respect to a piece of bait with the main line means 12 wrapped therearound. A plurality of loop means 18 are selectively secured with respect to the main line 12 at spaced positions therealong. Each of these loops is preferably one or two inches in loop diameter 32 and is spaced with respect to one another by an adjacent spacing distance 30 of approximately two inches.

With this configuration when the main line 12 is wrapped around the piece of bait 10, the plurality of loops 18 will extend outwardly therefrom in many different directions and orientations to provide a means of entanglement for engaging of a crab which attempts to feed upon the bait 10.

A first extra line means 20 is positioned at the lower end of the main line means to facilitate attachment thereof with respect to the bait 10. A second extra line means 22 is positioned adjacent the upper end means of the main line to fascilitate retaining thereof by the user of fisherman. A leader 24 may also be included secured to the upper end 14 of main line means 12 or secured with respect to the second extra line means 22 to facilitate attaching, detaching and general use by a fisherman.

Preferably the linear crab trap will be formed of a standard fishing line such as nylon monofilament line 26. This type of line is particularly useful in the formation of the individual loop means 18. That is, one manner of forming loops 18 is to tie the main line into knots 34 at spaced positions therealong in such a manner as to form the loops by a formation of a knot in the main line. In this manner the loops can be selectively untied or moved as chosen by the fisherman for the specific application. The loops themselves also of course could be separate sections of line which are attached to the main line at spaced locations therealong. With either configuration, the usage of a nylon monofilament line 26 is preferable to facilitating entanglement with respect to a crab 40 and to facilitate removal and untangling immediately prior to reuse of the linear crab trapping device of the present invention.

In normal usage a fisherman will perhaps be located with a boat and at that point will place the first extra line means 20 and the lower end 16 of main line 12 in abutment with respect to a piece of bait 10 such with a small fish or the like. The user will then wrap the main line 12 and the individual loop means 18 attached thereto about the piece of bait in such a manner that the loops will extend in all directions adjacent to the bait 10. Once the bait is secured with the wrapped portion of main line means 12 the leader 24 will be attached with respect to a fishing pole or other line which the fisherman is using. The linear crab trapping device of the present invention will then be dropped downwardly into the water either to the bottom or at any specific chosen depth. When a crab initiates feeding the fisherman will wait until enough feeding has occurred such that the crab has become significantly and sufficiently entangled with respect to the plurality of loop means 18 to maintain engagement of the main line 12 with respect to the crab 40.

The user or fisherman will then pull upwardly on the upper end means 14 or the second extra line means 22 in order to remove the linear crab trap from the ocean. The crab will be so entangled at this point with respect to the loops 18 that he will be pulled upwardly with the linear crab trap. Once the trap is on board ship, the user can remove the crab from entanglement and rewrap a new piece of bait or reutilize the old piece of bait 10 and proceed to drop the linear crab trapping device into the water for entanglement with another crab.

This procedure involves a crabbing device which is simple and easy to use and so inexpensive as to be disposable after merely a few usages as desired.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A linear crab trapping device adapted to be wrapped around a piece of bait, said trapping device comprising:
  (a) a main line means extending longitudinally and adapted to be wrapped around a piece of bait for surrounding of same, said main line means including an upper end means attached with respect to a user and a lower end means adjacent the bait; and
  (b) a plurality of loop means each being secured with respect to said main line means and positioned in spaced relation with respect to one another therealong, each of said loop means extending laterally outwardly with respect to said longitudinally extending main line means, said loop means being spaced and adjacent with respect to one another to be adapted to engage a crab feeding on the piece of bait for entangling thereof to retain the crab therein for securement with respect to said main line means.

2. The linear crab trapping device as defined in claim 1 wherein said loop means are integral with respect to said main line means.

3. The linear crab trapping device as defined in claim 1 wherein said main line means is approximately five feet in longitudinal length.

4. The linear crab trapping device as defined in claim 1 further including first extra line means at said lower end means of said main line means to facilitate attachment thereof with respect to the piece of bait.

5. The linear crab trapping device as defined in claim 1 further including a second extra line means at said upper end means of said main line means to facilitate holding thereof by the user.

6. The linear crab trapping device as defined in claim 1 further including leader means secured to said upper end means of said main line means to facilitate holding thereof by the user.

7. The linear crab trapping device as defined in claim 1 wherein said loop means are each approximately one inch in diameter.

8. The linear crab trapping device as defined in claim 1 wherein said loop means are fixedly held in positions in spaced relation with respect to one another along said main line means.

9. The linear crab trapping device as defined in claim 1 wherein said loop means are movably positionable along said main line means.

10. The linear crab trapping device as defined in claim 1 wherein said main line means is thirty pound test line.

11. The linear crab trapping device as defined in claim 1 wherein said main line means is a nylon monofilament line.

12. The linear crab trapping device as defined in claim 1 further including weight means secured with respect to said main line means to facilitate movement of the linear crab trapping device downwardly below the water surface.

13. The linear crab trapping device as defined in claim 1 wherein said main line means and said loop means are made of one integral line with sections thereof tied in loops to form said loop means.

14. The linear crab trapping device as defined in claim 1 wherein said loop means are each approximately two inches in diameter.

15. The linear crab trapping device as defined in claim 1 wherein said main line means is ten pound test line.

16. The linear crab trapping device as defined in claim 1 wherein said loop means are spaced from one another by approximately two inches.

17. The linear crab trapping device as defined in claim 1 including approximately twenty-five of said loop means.

18. A linear crab trapping device adapted to be wrapped around a piece of bait, said trapping device comprising:
(a) a main line means of thirty pound test nylon monofilament line being approximately five feet in length and extending longitudinally to be adapted to be wrapped around a piece of bait for surrounding of same, said main line means including an upper end means attached with respect to a user and a lower end means adjacent the bait, said main line means including;
 (1) a first extra line means at said lower end means of said main line means to facilitate attachment thereof with respect to the piece of bait;
 (2) a second extra line means at said upper end means of said main line means to facilitate holding thereof by the user;
(b) approximately twenty-five loop means each being fixedly secured with respect to said main line means and spatially disposed therealong at approximately two inches from each adjacent loop means, said loop means being approximately one to two inches in diameter, each of said loop means extending laterally outwardly with respect to said longitudinally extending main line means, said loop means being spaced and adjacent with respect to one another to be adapted to engage a crab feeding on the piece of bait for entangling thereof to retain the crab therein for securement with respect to said main line means;
(c) a leader means secured to said second extra line means of said main line means to facilitate holding thereof by a user; and
(d) a weight means secured with respect to said main line means to facilitate movement of the linear crab trapping device downwardly below the water surface as desired.

* * * * *